(12) United States Patent
Sugiyama

(10) Patent No.: US 8,640,674 B2
(45) Date of Patent: Feb. 4, 2014

(54) BI-FUEL ENGINE

(71) Applicant: Suzuki Motor Corporation, Shizuoka (JP)

(72) Inventor: Kazuo Sugiyama, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 13/719,982

(22) Filed: Dec. 19, 2012

(65) Prior Publication Data

US 2013/0174814 A1 Jul. 11, 2013

(30) Foreign Application Priority Data

Jan. 5, 2012 (JP) ................... 2012-000813

(51) Int. Cl.
*F02M 61/14* (2006.01)
(52) U.S. Cl.
USPC ............ 123/470; 123/525; 123/575; 123/299
(58) Field of Classification Search
USPC ................ 123/525, 575, 468–472, 299, 304, 123/27 GE, 1 A, 1 R, 195 A, 195 C, 184.61, 123/184.38
See application file for complete search history.

(56) References Cited

U.S. PATENT DOCUMENTS

| 5,546,908 | A | * | 8/1996 | Stokes | 123/480 |
| 5,713,336 | A | * | 2/1998 | King et al. | 123/525 |
| 2005/0205067 | A1 | * | 9/2005 | Koide et al. | 123/470 |
| 2008/0184964 | A1 | * | 8/2008 | Parish | 123/470 |
| 2010/0251993 | A1 | * | 10/2010 | Sugiyama | 123/299 |

FOREIGN PATENT DOCUMENTS

JP 2004-36482 A 2/2004

* cited by examiner

*Primary Examiner* — Hung Q Nguyen
(74) *Attorney, Agent, or Firm* — Rothwell, Figg, Ernst & Manbeck, P.C.

(57) ABSTRACT

A surge tank 52 is placed above an engine main body 4. Plural intake runners 51 include curved portions 51C, respectively, which are placed on one side of the engine main body 4, and sloped portions 51D extending from the surge tank 52 to the curved portions 51C. An air cleaner 7 is placed above the sloped portions 51D. A liquid fuel injection unit 8 is placed in a space between the engine main body 4 and the intake runners 51. A gaseous fuel injection unit 11 is placed in a gap between the surge tank 52 and the air cleaner 7. Gaseous fuel injection valves 103 are held by a bracket on a gaseous fuel delivery pipe 10A in a way that they are placed under the air cleaner, each of them being placed in a space between the adjacent two of the sloped portions 51D.

4 Claims, 7 Drawing Sheets

*F I G. 5*
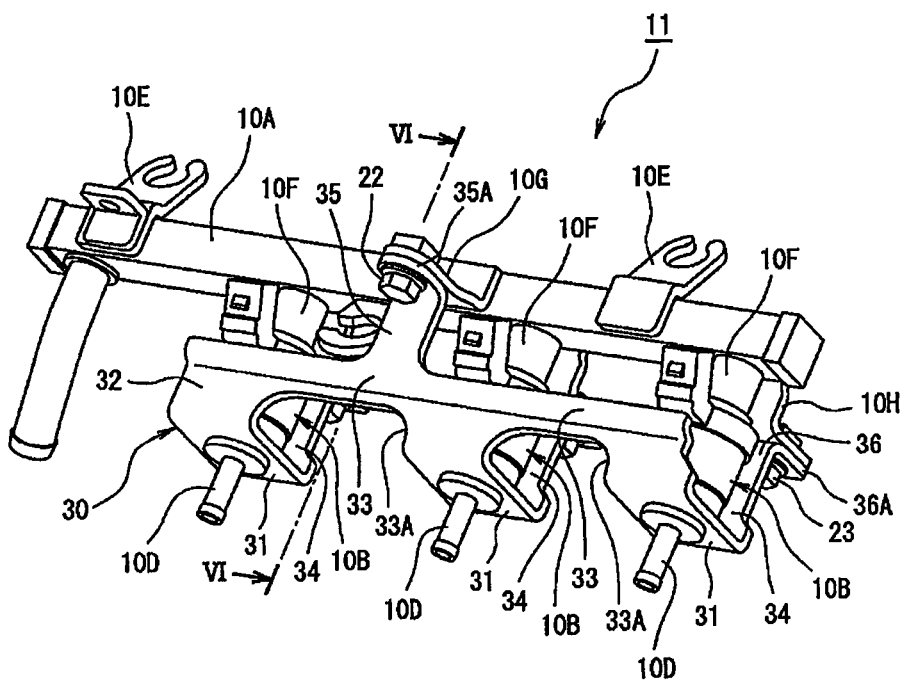
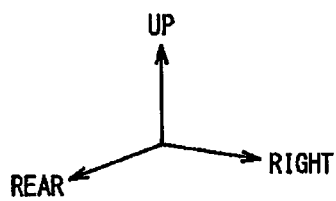

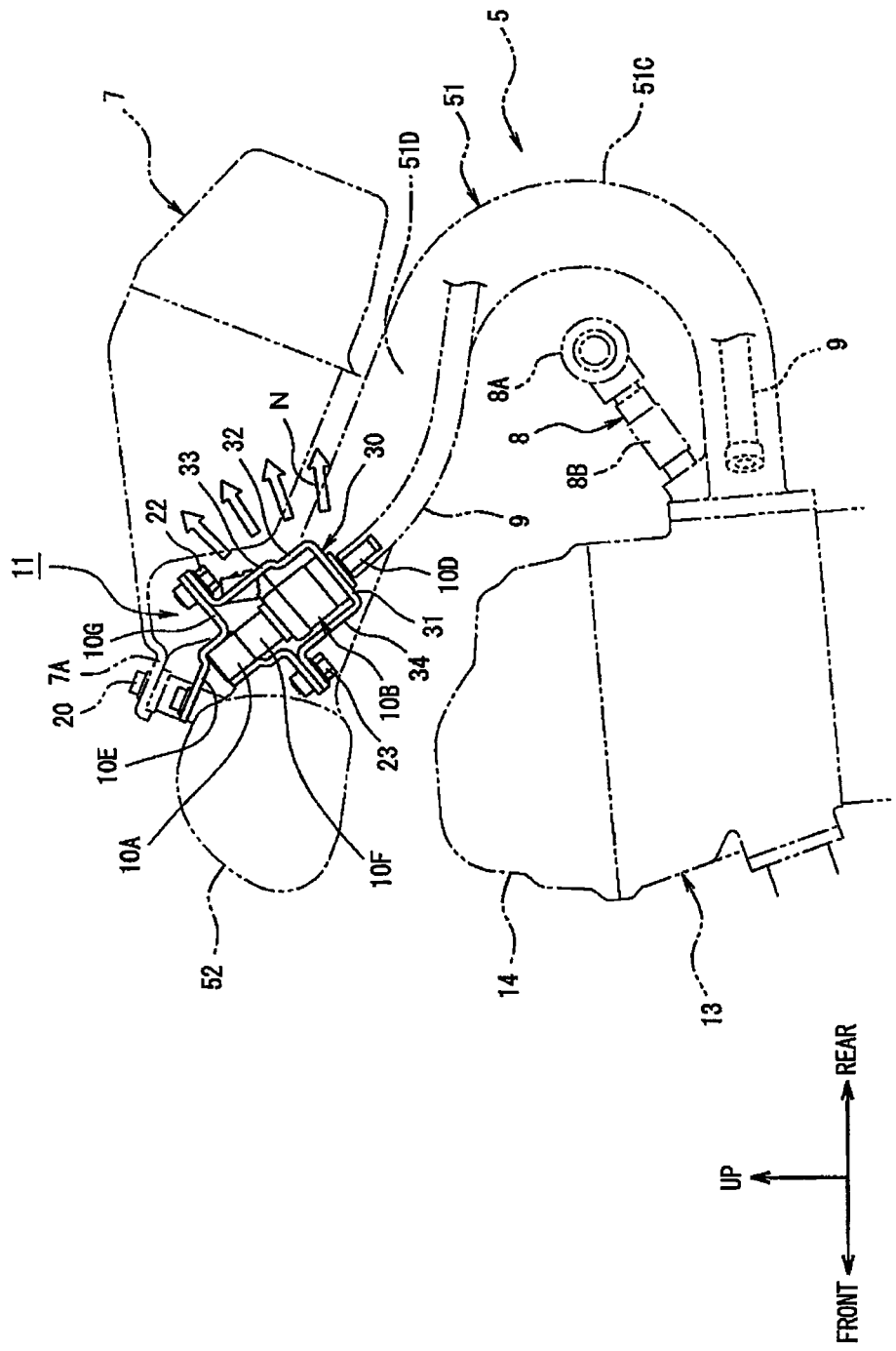

BI-FUEL ENGINE

RELATED APPLICATION

The present application claims priority to Japanese Patent Application No. 2012-000813 filed on Jan. 5, 2012, the entire content of which is being incorporated herein by reference.

TECHNICAL FIELD

The present invention relates to a bi-fuel engine that can combust two types of fuel, one type being liquid fuel and a second type being gaseous fuel.

BACKGROUND ART

As internal combustion engines for vehicles, there are known bi-fuel engines including a liquid fuel injection unit to inject liquid fuel, such as gasoline and a gaseous fuel injection unit to inject gaseous fuel, such as natural gas (CNG: compressed natural gas). It is known in the art for a bi-fuel engine to mount a liquid injection unit above intake runners in a manner that it is directed toward the upper surface of each of the intake runners and a gaseous fuel injection unit within a narrow space between the intake runners and a cylinder head (see patent literature 1 for example). In the bi-fuel engine, it is in such narrow space between the intake runners and the cylinder head to connect the gaseous fuel injection unit to the intake runners at lower portions (i.e. portions of the intake runners facing downwards).

PRIOR ART DOCUMENT

Patent Literature

Patent Literature 1: JP-A 2004-36482

In the above-mentioned conventional structure, however, the vehicle driver is likely to feel uncomfortable because the liquid fuel injection unit protrudes into an open space within the engine compartment to allow ease of transmission of noise issued during operation of liquid fuel injection valves to the passenger compartment. Moreover, the above-mentioned conventional structure poses a problem that a worker has difficulty in accessing the gaseous fuel injection unit and so there is a reduction in ease of maintenance of the gaseous fuel injection because the gaseous fuel injection unit is mounted under the intake runners. If, now, the above-mentioned conventional structure is modified in a way that the gaseous fuel injection unit is mounted where the liquid fuel injection unit is, there is a problem that the gaseous fuel injection unit protrudes into and is exposed to an open space above the intake runners within the engine compartment to allow ease of transmission of noise issued during operation of gaseous fuel injection valves to the passenger compartment. If the fuel injection unit, i.e. the gaseous or liquid fuel injection unit, is mounted in a way that it protrudes into or is exposed to the open space above the intake runners within the engine compartment, there is a problem that the fuel injection unit and the other components mounted within the engine compartment are likely to come into contact with each other when the vehicle receives an external force.

SUMMARY OF THE INVENTION

An object of the present invention, made in view of the above mentioned problems, is to provide a bi-fuel engine for a vehicle, which restrains transmission of noise issued during operation of gaseous fuel injection valves or liquid fuel injection valves to the vehicle passenger compartment with ease of maintenance of a gaseous fuel injection unit kept and that in good protected environment against mechanical contact with any of the other components within the vehicle engine compartment.

According to one implementation of the present invention, there is provided a bi-fuel engine for a vehicle including an intake manifold that includes a plurality of intake runners, which are connected to one side of an engine main body of the engine at intervals with their downstream ends communicating with respective intake ports within the engine main body, and a surge tank, to which upstream ends of the plurality of intake runners are connected at intervals; an air cleaner communicating with the surge tank; a liquid fuel injection unit for supplying liquid fuel to the engine main body; a plurality of gaseous fuel hoses, which have one ends connected to the intake runners at positions near their downstream ends; a plurality of gaseous fuel injection valves, to which the other ends of the gaseous fuel hoses are connected; and a gaseous fuel delivery pipe, to which the plurality of gaseous fuel injection valves are connected, in which the surge tank is placed above the engine main body; the intake runners include curved portions, respectively, which are placed on one side of the engine main body, and sloped portions extending from the surge tank to the curved portions; the air cleaner is placed above the sloped portions; the liquid fuel injection unit is placed in a space between the engine main body and the intake runners; the gaseous fuel delivery pipe is placed in a gap between the surge tank and the air cleaner; and the gaseous fuel injection valves are held by a bracket on the one side of the engine main body where the intake manifold is placed in a way that the gaseous fuel injection valves are placed under the air cleaner, each of the gaseous fuel injection valves being placed in a space between the adjacent two of the sloped portions.

It is preferable that the gaseous fuel delivery pipe is fixed to the intake manifold and placed between the surge tank and the air cleaner in a way that it extends across the sloped portions with respect to a direction in which the sloped portions extend, and the bracket includes a holder portion that holds a tip of each of the gaseous fuel injection valves, an upper cover portion that extends from an upper edge margin of the holder portion toward a base portion of the gaseous fuel injection valve to cover an upper side of the gaseous fuel injection valve, a lower cover portion that extends from a lower edge margin of the holder portion toward the base portion of the gaseous fuel injection valve, an upper extended portion letting the gaseous fuel, delivery pipe support the upper cover portion and toward the gaseous fuel delivery pipe, and a lower extended portion letting the gaseous fuel delivery pipe support the lower cover portion.

It is preferable that the upper cover portions are connected to each other by a plate-like suspension portion, and the suspension portion is integral with the upper extended portion and formed with cutouts to allow insertion of at least some of the sloped portions.

It is preferable that the gaseous fuel delivery pipe is fixed to the surge tank.

According to the present invention, there is provided a bi-fuel engine for a vehicle, which restrains transmission of noise issued during operation of gaseous fuel injection valves or liquid fuel injection valves to the vehicle passenger compartment with ease of maintenance of a gaseous fuel injection unit kept and that in good protected environment against mechanical contact with any of the other components within the vehicle engine compartment.

BRIEF DESCRIPTION OF THE DRAWINGS

FIG. 5 is a perspective view of a gaseous fuel injection unit of the implementation of bi-fuel engine according to the present invention.

FIG. 7 is a schematic view illustrating the positional relationship of the gaseous fuel injection unit with an air cleaner in the implementation of bi-fuel engine according to the present invention.

DESCRIPTION OF IMPLEMENTATION(S)

Figure 1:
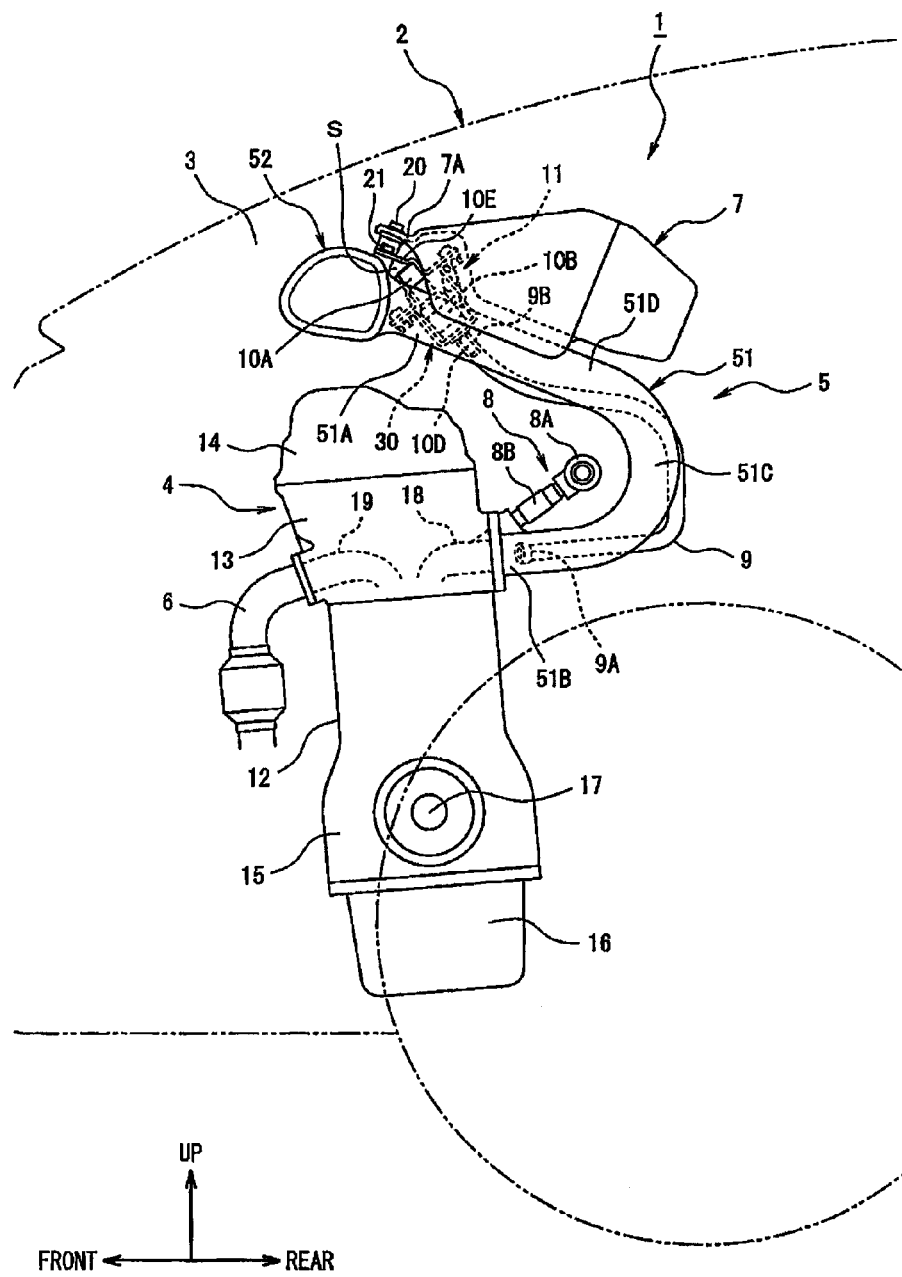
FIG. 1 is a side view of an implementation of a bi-fuel engine for a vehicle according to the present invention.

Referring to the accompanying drawings, one implementation of a bi-fuel engine for a vehicle (called "an engine" below) according to the present invention is described in detail. It is noted that the drawings are schematic, and the dimension of each of elements or the ratio in dimension between them are different from the real. The dimension of each element and the ratio in dimension may partially differ throughout the drawings. In the implementation, for the convenience of explanation, arrows are used to indicate various directions toward front and rear, right and left, top and bottom in the drawings.

(Overview of Engine)

As shown in FIG. 1, the engine 1 is mounted inside an engine compartment 3 of a vehicle front part 2. The engine 1 includes an engine main body 4, an intake pipe in the form of an intake manifold 5, an exhaust manifold 6, an air cleaner 7, a liquid fuel injection unit 8, a plurality of gaseous fuel hoses 9 and a gaseous fuel injection unit 11 in which gaseous fuel injection valves 10B are held by a bracket 30.

(Engine Main Body)

As shown in FIG. 1, an engine main body 4 includes a cylinder block 12, a cylinder head 13 placed on the top of the cylinder block 12, a cylinder cover 14 placed on the top of the cylinder head 13, a lower crankcase 15 placed on the bottom of the cylinder block 12 and an oil pan 16 placed on the bottom of the lower crankcase 15.

The lower crankcase 15 pivotally supports a crankshaft 17. A plurality of cylinders (not shown) is formed in the cylinder block 12. A piston moving up and down (not shown) is received in each of the cylinders. The pistons moving up and down in their respective cylinders are connected to the crankshaft 17 via connecting rods (not shown) to convert reciprocating movement of each piston to a rotary movement.

The cylinder head 13 is formed with a plurality of intake ports 18 for admitting air into the cylinders and a plurality of exhaust ports. The cylinder head 13 has intake and exhaust valves (not shown), above each of the cylinders, arranged to open and close the intake and exhaust ports 18 and 19 for the cylinder.

Valve gears (not shown) for the intake and exhaust valves are installed in an upper portion of the cylinder head 13. A cylinder cover 14 is detachably fixed to the upper portion of the cylinder head 13 by fastening means such as bolts. Maintenance such as adjustment and repair of the above mentioned valve gears (not shown) and other parts can be done after removing the cylinder cover 14.

(Intake Manifold)

As shown in FIG. 1, an intake manifold (or an intake pipe) 5 includes a plurality of intake runners 51 and a surge tank 52. The surge tank 52 is placed above the engine main body 4. When the cylinder cover 14 is removed, maintenance such as visual observation, inspection, and repair of, for example, the valve gears (inclusive of camshafts) in the upper portion of the cylinder head 13.

Figure 3:
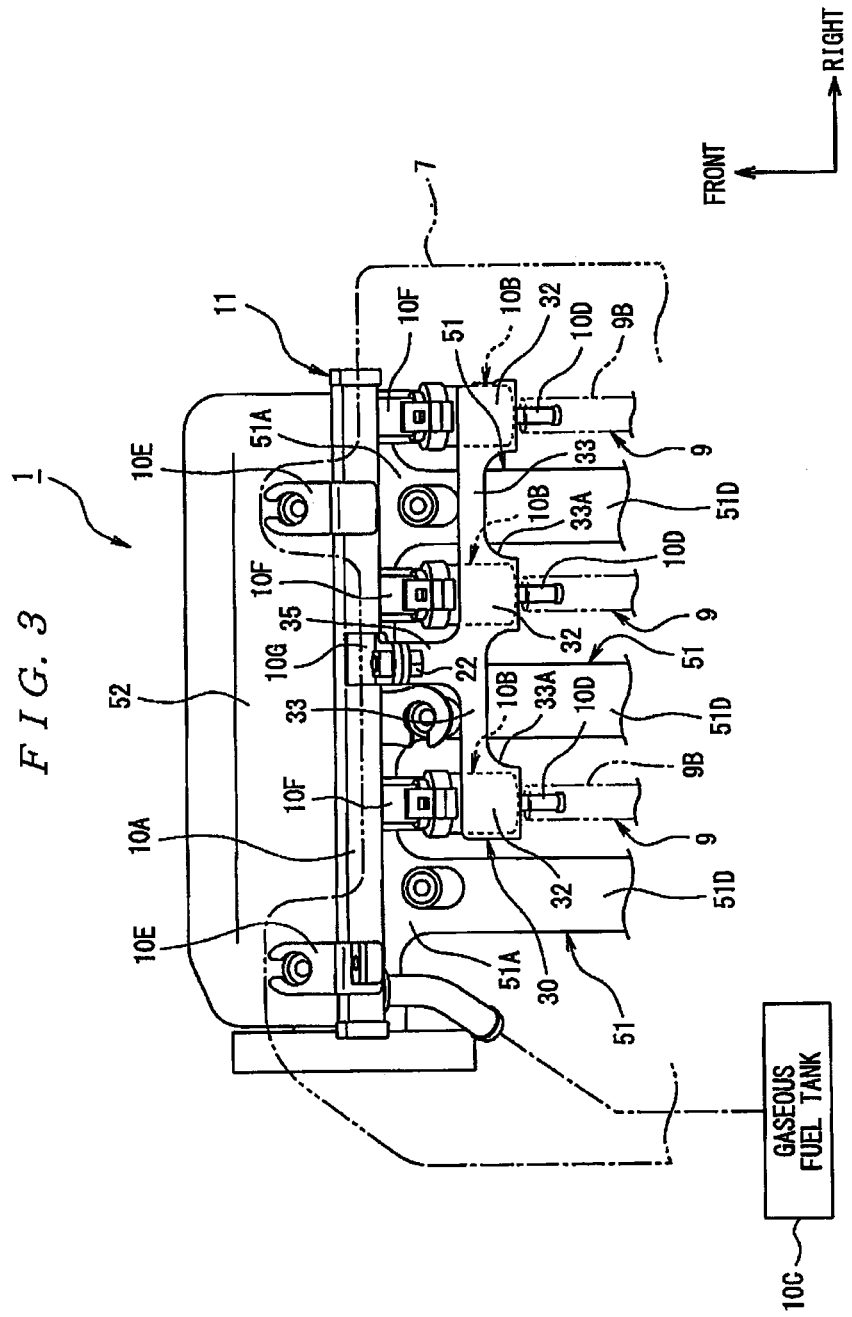
FIG. 3 is a fragmentary plan view showing a major portion of the implementation of bi-fuel engine according to the present invention.

As shown in FIG. 3, the intake runners 51 are integrated in a way that they are spaced at intervals longitudinally of the surge tank 52 (in the width direction in the present implementation) with their upstream ends 51A communicating with the surge tank 52 at different points. As shown in FIG. 1, downstream ends 51B of the intake runner 51 are connected to one side of the cylinder head 13 in away that they communicate with respective intake ports 18. In the present implementation, the intake runners 51 of the intake manifold 5 are placed on the rear, with respect to the longitudinal centerline of the vehicle, side of the engine main body 4 within the engine compartment 3.

Figure 2:
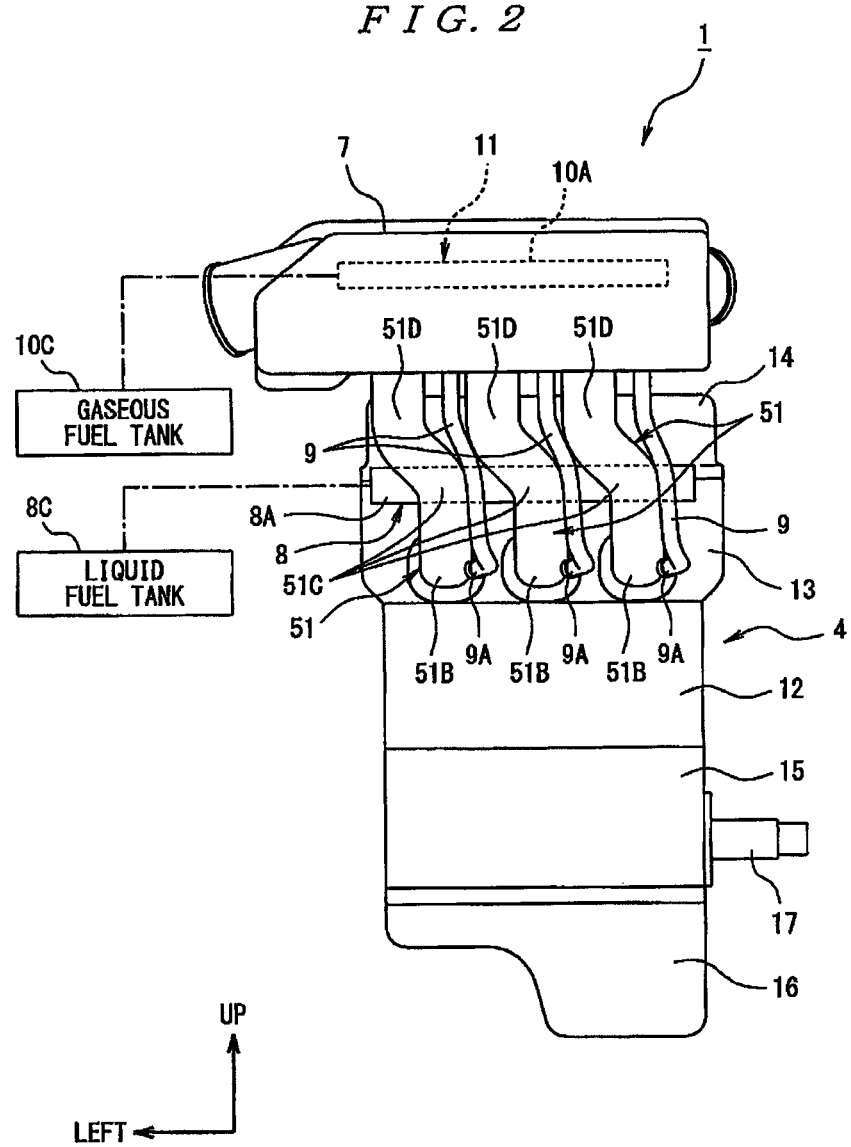
FIG. 2 is a rear view of the implementation of bi-fuel engine according to the present invention.

As shown in FIGS. 1 and 2, each of the intake runners 51 includes a curved portion 51C formed in an intermediate point near its downstream end 51B. The curved portion 51C is provided to allow the intake runner 51, which extends from the side of cylinder head 13 laterally (longitudinally of the vehicle when the engine is installed in the present implementation), to extend to the surge tank 52 in an obliquely upward direction. That portion of the intake runner 51 which extends from its upstream end 51A to the curved portion 51C makes a sloped portion 51D extending backward (in a direction from the upstream end 51A to the curved portion 51C) and sloped in an obliquely downward direction.

As mentioned above, the intake runners 51 take not the form passing directly to the surge tank 52 but the form passing around an area on the side of cylinder head 13. On the other hand, the exhaust manifold 6 is attached to the side (front side) of the cylinder head 13 opposite to the side to which the intake manifold 5 is attached (see FIGS. 1 and 4)

(Liquid Fuel Injection Unit)

As shown in FIGS. 1 and 2, the liquid fuel injection unit 8 is placed in a space between the plurality of intake runners 51 and the cylinder head 13 with the cylinder head cover 14. The liquid fuel injection unit 8 includes a liquid fuel delivery pipe 8A and a plurality of liquid fuel injection valves 8B connected to the liquid fuel delivery pipe 8A at predetermined intervals in a way that they correspond to the intake ports 18.

The liquid fuel delivery pipe 8A extends in a direction in which the intake runners 51 are spaced, i.e. in the axial direction of the crankshaft 17 (the width direction of the vehicle when the engine 1 is mounted). Plural liquid fuel injection valves 88 are fixed to the cylinder head 13 and arranged for injection of liquid fuel (for example, gasoline) into respective intake ports 18.

As shown in FIG. 2, the liquid fuel delivery pipe 8A of the liquid fuel injection unit 8 is connected to a liquid fuel tank 8C for storing liquid fuel. The liquid fuel injection valves 8B perform the fuel injection based on control signals from the vehicle control unit in a mode when the engine 1 combusts liquid fuel.

As is readily seen from the foregoing description, it is preferable that the curvature of the curved portions 51C is properly set to secure a space enough to receive the liquid fuel injection unit 8 between the intake runners 51 and the cylinder head 13 with the cylinder head cover 14.

(Air Cleaner)

Figure 4:
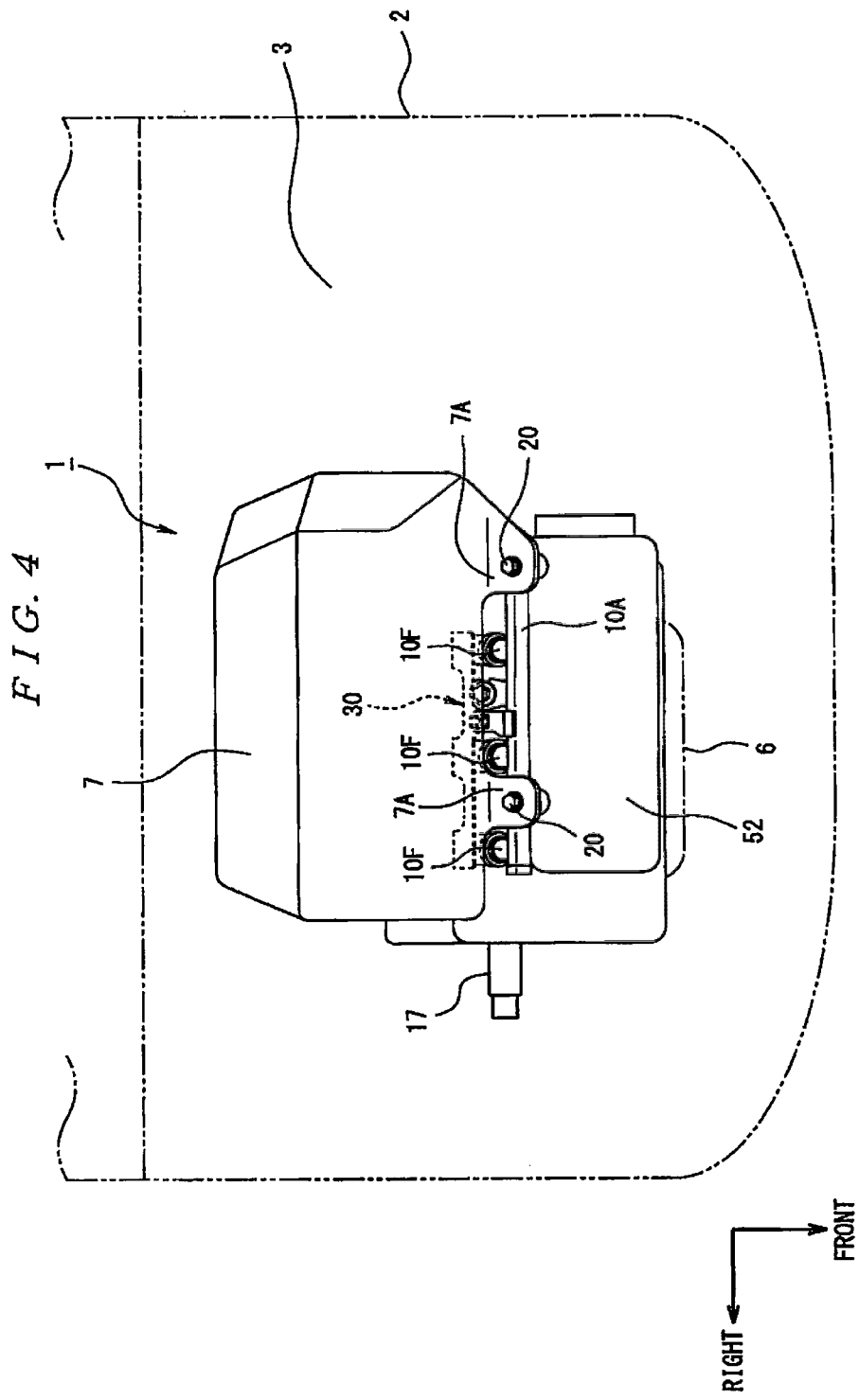
FIG. 4 is a plan view of the implementation of bi-fuel engine according to the present invention.

As shown in FIGS. 1 and 2, the air cleaner 7 is placed right above the sloped portions 51D of the intake runners 51. The air cleaner 7 is connected to the surge tank 52 in a way that they communicate with each other, not shown though. The air cleaner 7 extends to cover almost the overall length of each of the sloped portions 51D. Enough installation space for the air cleaner 7 is provided above and in the neighborhood of the curved portions 51C because the sloped portions 51D extend downward in an oblique direction to the curved portions 51C. As shown in FIGS. 1 and 4, the air cleaner 7 is fixed to the surge tank 52 with its plate-like mounting tabs 7A, on the edge margin near the surge tank 52, fixed to the surge tank 52 by bolts 20.

(Gaseous Fuel Injection Unit)

As shown in FIGS. 1 through 3, the gaseous fuel injection unit 11 includes a gaseous fuel delivery pipe 10A, gaseous fuel injection valves 10B and a bracket 30 that holds the gaseous fuel injection valves 10B. As shown in FIG. 3, the gaseous fuel delivery pipe 10A extends in parallel with a line interconnecting the upstream ends 51A of the intake runners 51 that are connected to the surge tank 52. A gaseous fuel tank 10C, which stores gaseous fuel (for example, CNG), is connected via a pipe to the gaseous fuel delivery pipe 10A. As shown in FIG. 1, the gaseous fuel delivery pipe 10A is fixed to the surge tank 52 with its integral plate-like mounting tabs 10E fixed to the surge tank 52 by bolts 21.

Figure 6:
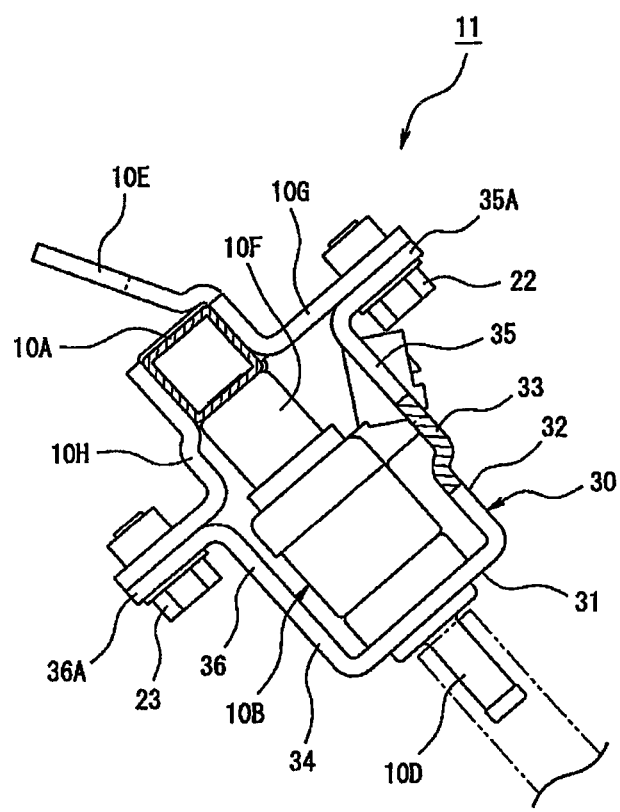
FIG. 6 is a section taken through the line VI-V1 in FIG. 5.

As shown in FIG. 3, plural gaseous fuel injection valves 10B are connected to the gaseous fuel delivery pipe 10A via connecting portions 10F. These gaseous fuel injection valves 10B are arranged at predetermined intervals along gaseous fuel delivery pipe 10A in its longitudinal direction (in the width direction of the vehicle in the case of the present implementation) in a way that they communicates with the gaseous fuel delivery pipe 10A at different points. As shown in FIGS. 5 and 6, the gaseous fuel delivery pipe 10A has mounting tabs 10G and 10H fixed to its upper and lower sides at appropriate positions, each of the mounting tabs 10G and 10H being a plate with its tip bending at a right angle (in the form of letter "L").

The above mentioned gaseous fuel injection valves 10B are integrally held by the bracket 30. The bracket 30 is fixed to the above mentioned mounting tab 10G by a bolt 22. The structure of the bracket 30 is described later. The gaseous fuel injection valves 10B are spaced one after another in almost the same manner as the upstream ends 51A of the intake runners 51 are. The gaseous fuel injection valves 10B and the upstream ends 51A of intake runner 51 are placed alternately in the direction (i.e. in the width direction of the vehicle) in which the intake runners 51 are spaced.

The gaseous fuel injection unit 11, in which the plural gaseous fuel injection valves 10B are connected to the gaseous fuel delivery pipe 10A via the connecting portions 10F, is placed in a space S between the air cleaner 7 and the surge tank 52 (see FIG. 1). The gaseous fuel injection valves 10B are held by the bracket 30 in a way that the gaseous fuel injection valves 10B are placed under the air cleaner 7, each of the gaseous fuel injection valves 10B being placed in a space between the adjacent two of the sloped portions 51D. As shown in FIGS. 1 and 3, the gaseous fuel injection valves 108 is placed in the neighborhood of the upstream ends 51A of the intake runners 51, each of the gaseous fuel injection valves 108 being placed between the adjacent two of the upstream ends 51A (i.e. the adjacent two of the sloped portions 51D).

As shown in FIG. 1, the gaseous fuel injection valves 10B have their tips 10D, which are connected to gaseous fuel hoses 9, angled so as to face the curved portions 51C of the intake runners 51.

As shown in FIGS. 1 through 3, each of the gaseous fuel hoses 9 has one end 9A connected to one of the intake runners 51 at a position in the neighborhood of the downstream end 51B and the other end 9B connected to one of the tips (nozzles) 10D of the gaseous fuel injection valves 10B. As shown in FIG. 1, each of these gaseous fuel hoses 9 is placed to extend along one of the intake runners 51.

In the gaseous fuel injection unit 11, the gaseous fuel injection valves 10B perform the fuel injection based on control signals from the vehicle control unit in a mode when the engine 1 combusts gaseous fuel.

(Bracket)

Next, the structure of the bracket 30 is described. In the present implementation, the bracket 30 is made by folding a metal plate. As shown in FIGS. 5 and 6, the bracket 30 includes holder portions 31, upper cover portions 32, lower cover portions 34, a suspension portion 33 integrally interconnecting the upper cover portions 32, an integral upper extended portion 35 with the suspension portion 33 and integral lower extended portions 36 with the lower cover portions 34. Each of the upper cover portions 32 and one of the lower cover portions 34, which share the same one of the holder portions 31, are bent with respect to the holder portion and in parallel.

Each of the holder portions 31 permits insertion of a tip (nozzle) 10D protruding from a leading end surface of one of the gaseous fuel injection valve 10B and rests in abutting engagement on the leading end surface. Each of the upper cover portions 31 extends from an upper edge margin of one of the holder portions 31 toward a base portion of one of the gaseous fuel injection valves 10B (i.e. the connecting portion 10F) to cover an upper side of the gaseous fuel injection valve 10B. The suspension portion 33 is a plate integrally interconnecting the upper cover portions 32 and integrally formed with the upper cover portions 32. At the rear edge margin (near the curved portions 51C), the suspension portion 33 is formed with cutouts 33A to allow at least some (two in FIG. 5) of the sloped portions 51D.

Each of the lower cover portions 34 extends from a lower edge margin bottom edge of one of the holder portions 31 toward a base portion of one of the gaseous fuel injection valves 10B and covers the lower side of the gaseous fuel injection valve 10B. The above mentioned upper extended portion 35 extends from the suspension portion 33 to the gaseous fuel delivery pipe 10A. The upper extended portion 35 has its leading end bent to form a bent plate portion 35A in the shape of character "L". The bent plate portion 35A is fixed, by a bolt 22, to the mounting tab 10G on the upper side of the gaseous fuel delivery pipe 10A.

The lower extended portions 36 extend from the respective lower cover portions 34 to the gaseous fuel delivery pipe 10A. Each of the lower extended portions 36 has its leading end bent to form a bent plate portion 36A in the shape of "L". Each of the bent plate portion 36A is fixed, by a bolt 23, to the mounting tabs 10H supported by the gaseous fuel delivery pipe 10A.

As can be understood from the foregoing description of the present implementation of engine 1, the present implementation has an effect of confining noise, i.e. operating noise from the liquid fuel injection valves 8B of the liquid fuel injection unit 8, to the space surrounded by the intake runners 51 and the engine main body 4 (i.e. cylinder head 13, cylinder head cover) because the liquid fuel injection unit 8 is arranged in this space. Therefore, the present implementation prevents the operating noise issued by the liquid fuel injection valves 8B from being transmitted to the passenger compartment.

The present implementation improves ease of maintenance of the gaseous fuel injection unit 11 because the gaseous fuel injection system 11 can be put on a high position within the engine compartment 3. As shown in FIG. 7, the present implementation can trap operating noise radiated upwardly in radial directions (as indicated by arrows N in FIG. 7) with respect to the axis of each of the gaseous fuel injection valves 10B when the gaseous fuel injection valves 10B open and close, thus preventing transmission of the operating noise to the passenger compartment because each of the gaseous fuel injection valves 10B of the gaseous fuel injection unit 11 is arranged in a space within that space which is given by overlapping a space under the air cleaner 7 and a space between the adjacent two of the sloped portions 51D of the intake runners 51 with each other.

As mentioned above, the present implementation of a bi-fuel engine for a vehicle can cause less annoyance to occupants in the passenger compartment by controlling the transmission of either operating noise the liquid fuel injection unit 8 or operating noise of the gaseous fuel injection unit 11.

Furthermore, the present implementation can avoid undesired contact between the air cleaner 7 and the gaseous fuel injection valves 10B even if the air cleaner 7 is forced to move over the sloped portions 51D when the vehicle receives an external force because the gaseous fuel injection valves 10B are put under the air cleaner 7. Incidentally, this can protect the gaseous fuel injection valves 103 of the gaseous fuel injection unit 11, particularly the tips (nozzles) 10D with the lowest rigidity in the gaseous fuel injection valves 10B.

As shown in FIG. 7, the present implementation enables the upper cover portions 32 of the bracket 30 to cut the operating noise radiated upwardly in radial directions (toward the air cleaner 7) from the gaseous fuel injection valves 10B before being radiated to the air cleaner 7. In addition, the present implementation enables the lower cover portions 34 of the bracket 30 to cut the operating noise radiated downwardly in radial directions from the gaseous fuel injection valves 10B, preventing leak of the operating noise into the passenger compartment from the lower side of the gaseous fuel injection valves 10B. In this way, the present implementation of a bi-fuel engine for a vehicle enables the bracket 30 and the air cleaner 7 to prevent the operating noise originated at the gaseous fuel injection valves 10B from being transmitted to the passenger compartment.

The present implementation enables the bracket 30 to hold the gaseous fuel injection valves 10B to the gaseous fuel delivery pipe 10A in a stable manner because the bracket 30 has its upper and lower extended portions 35 and 36 fixed to the gaseous fuel delivery pipe 10A and covers the gaseous fuel injection valves 10B in their axial direction. This restrains vibration of the tips (nozzles) 10D of the gaseous fuel injection valves 10B protruding from the gaseous fuel delivery pipe 10A from growing up to a considerable degree, thus restraining an increase in the operating noise caused due to such vibration.

Further, the present implementation enables the upper cover portions 32 of the bracket 30 to prevent serious undesired contact between the air cleaner 7 and the gaseous fuel injection valves 10B even if the air cleaner 7 should almost come into contact with the gaseous fuel injection valves 10B when the vehicle receives an external force. Therefore, in the present implementation of a hi-fuel engine for a vehicle, the upper cover portions 32 securely protect the gaseous fuel injection valves 10B.

According to the present implementation, the upper cover portions 32, which extend above and in axial direction of the plurality of gaseous fuel injection valves 10B, respectively, are integrated with each other by the suspension portion 33. Thus, the present implementation restraints the gaseous fuel injection valves 10B from vibrating individually. When one of the gaseous fuel injection valves 10B injects fuel, the other gaseous fuel injections valves 10B will have effect to reduce vibration induced by the one gaseous fuel injection valve 10B. Therefore, the present implementation restrains an increase in the operating noise caused due to vibration because the suspension portion 33 is provided.

The present implementation makes it possible to let the tips of the bracket 30 enter between the sloped portions 51D without any undesired contact between the bracket 30 and the sloped portions 51D of the intake runners 51 because the suspension portion 33 of the bracket 30 is formed with the cutouts 33A to allow insertion of the sloped portions 51D of the intake runners 51. In this way, forming the bracket 30 with the cutouts 33A makes it possible to let the gaseous fuel injection valves 10B under the air cleaner 7. In this way, the present implementation makes it possible for the air cleaner to cut noise, such as operating noise issued by the gaseous fuel injection valves 10B because it is secured that the gaseous fuel injection valves 10B are under the air cleaner 7.

The present implementation allows an engine designer to elongate the intake runners 51 of the intake manifold 5 without receiving any influence from the gaseous fuel injection unit 11 because this engine 1 is configured such that the intake manifold 5 and the air cleaner 7 do not receive any undesired contact from the gaseous fuel injection unit 11.

The present implementation makes it possible to enlarge space to place the air cleaner 7 to allow the air cleaner 7 to secure necessary volume because the air cleaner 7 is placed above the sloped portions 51D of the intake runners 51. Moreover, the present implementation has an effect of making contribution to reduction of inhalation resistance of the air cleaner 7 by not only securing necessary volume of the air cleaner 7 but also further enlarging the volume.

The present implementation allows attaching both the mounting tabs 10E of the gaseous fuel injection 11 and the mounting tabs 7A of the air cleaner 7 to the surge tank 52 because the gaseous fuel injection unit 11 is between the surge tank 52 and the air cleaner 7. This results in improved ease of assembly of the air cleaner 7, the gaseous fuel injection unit 11 and the associated parts because the surge tank 52 is above the engine 1.

The present implementation makes it possible for the sloped portions 51D of the intake runners 51 to prevent the gaseous fuel injection valves 10B, which are low in rigidity, of the gaseous fuel injection unit 11 from coming into direct, serious and undesired contact with parts mounted to the vehicle or parts of the engine 1 when the vehicle receives an external force. Therefore, the present implementation secures protection of the gaseous fuel injection unit 11 in the engine 1.

The present implementation permits lengthening an overall length of each of the gaseous fuel hoses 9 by routing the gaseous fuel hose 9 along one of the elongated intake runners 51 from one of the gaseous fuel injection valves 10B to the downstream end 51B of the intake runner 51. This makes it easy for a worker to bend the gaseous fuel hoses 9 when connecting the gaseous fuel injection valves 10B to the downstream ends 51B of the intake runners 51.

The present implementation securely improves ease of installing the engine 1 because the gaseous fuel injection hoses 9 are easy to bend due to lengthening of the overall length of each of the gaseous fuel hoses 9 to make it easy for a worker to route the gaseous fuel injection hoses 9 around and mount them to the engine main body 4 within a narrow engine compartment 3.

The present implementation improves ease of installing the air cleaner 7 because the air cleaner 7 is fixed to the surge tank 52 by bolts 20 extending through the plate-like mounting tabs 7A and thus easy to mount or remove.

The present implementation has an advantage that the gaseous fuel injection unit 11 is easy to install because the mounting tabs 10E, which integrally supports the gaseous fuel delivery pipe 10A and the gaseous fuel injection valves 10B, are fixed to the surge tank 52 by the bolts 21.

(Other Implementations)

With regard to the foregoing description of the implementation, it should not be understood that the statements and the drawings which make a part of the disclosure of the implementation limit the present invention. From this disclosure, various forms of alternative implementations, embodiments and operation technology may be clear to those skilled in the art.

In the foregoing description on the implementation, the bracket 30 has the upper and lower covers 32 and 34 only to cover upper and lower sides of the gaseous fuel injection valves 10B with lateral sides of them uncovered in order to reduce its weight. However, for example, a bracket 30 may have cylindrical covers coupled to a suspension portion 33 to cover all sides of the gaseous fuel injection valves 10B.

In the foregoing description on the implementation, the engine 1 is mounted to the vehicle body in a way that the intake manifold 5 faces backwards with respect to the longitudinal line of the vehicle body. However, the described function and effect of the present invention are taken regardless of how an engine 1 is mounted.

In the foregoing description on the implementation, the upper and lower extended portions 35 and 36 are fixed to the gaseous fuel delivery pipe 10A which is fixed to the surge tank 52. Variations and modifications to the disclosed implementations may become apparent to those skilled in the art and fall within the scope of the present invention. Examples of such variations and modifications are fixing the upper and lower extended portions 35 and 36 directly to the surge tank 52 or to the intake runners 51, which constitute the intake manifold (an intake pipe) at positions in the neighborhood of their upstream ends 51A.

EXPLANATION OF NOTATIONS 1 engine
4 engine main body
5 intake manifold (including intake runners)
7 air cleaner
7A mounting tab
8 liquid fuel injection unit
8A liquid fuel delivery pipe
8B liquid fuel injection valve
8C liquid fuel tank
9 gaseous fuel hose
10A gaseous fuel delivery pipe
10B gaseous fuel injection valve
10C gaseous fuel tank
10D tip (gaseous fuel injection valve)
10E mounting tab
10F connecting portion
10G, 10H mounting tab
11 gaseous fuel injection unit
13 cylinder head
18 intake port
30 bracket
31 holder portion
32 upper cover portion
33 suspension portion
34 lower cover portion
35 upper extended portion
36 lower extended portion
51 intake runner
51A upstream end
51B downstream end
51C curved portion
51D sloped portion
52 surge tank
S space

The invention claimed is:

1. A bi-fuel engine for a vehicle comprising an intake manifold that includes a plurality of intake runners, which are connected to one side of an engine main body of the engine at intervals with their downstream ends communicating with respective intake ports within the engine main body, and a surge tank, to which upstream ends of the plurality of intake runners are connected at intervals; an air cleaner communicating with said surge tank; a liquid fuel injection unit for supplying liquid fuel to said engine main body; a plurality of gaseous fuel hoses, which have one ends connected to said intake runners at positions near their downstream ends; a plurality of gaseous fuel injection valves, to which the other ends of said gaseous fuel hoses are connected; and a gaseous fuel delivery pipe, to which the plurality of gaseous fuel injection valves are connected, wherein
said surge tank is placed above said engine main body; said intake runners include curved portions, respectively, which are placed on one side of the engine main body, and sloped portions extending from said surge tank to said curved portions;
said air cleaner is placed above said sloped portions;
said liquid fuel injection unit is placed in a space between said engine main body and said intake runners;
said gaseous fuel delivery pipe is placed in a gap between said surge tank and said air cleaner; and
said gaseous fuel injection valves are held by a bracket on the one side of the engine main body where said intake manifold is placed in a way that the gaseous fuel injection valves are placed under said air cleaner, each of the gaseous fuel injection valves being placed in a space between the adjacent two of said sloped portions.

2. The bi-fuel engine according to claim 1, wherein
said gaseous fuel delivery pipe is fixed to said intake manifold and placed between said surge tank and said air cleaner in a way that it extends across said sloped portions with respect to a direction in which said sloped portions extend, and
said bracket includes a holder portion that holds a tip of each of said gaseous fuel injection valves, an upper cover portion that extends from an upper edge margin of the holder portion toward a base portion of the gaseous fuel injection valve to cover an upper side of the gaseous fuel injection valve, a lower cover portion that extends from a lower edge margin of the holder portion toward the base portion of said gaseous fuel injection valve, an upper extended portion letting the gaseous fuel delivery pipe support said upper cover portion and toward said gaseous fuel delivery pipe, and a lower extended portion letting the gaseous fuel delivery pipe support said lower cover portion.

3. The bi-fuel engine according to claim 1, wherein
said gaseous fuel delivery pipe is fixed to said intake manifold and placed between said surge tank and said air cleaner in a way that it extends across said sloped portions with respect to a direction in which said sloped portions extend,
said bracket includes a holder portion that holds a tip of each of said gaseous fuel injection valves, an upper cover portion that extends from an upper edge margin of the holder portion toward a base portion of the gaseous fuel injection valve to cover an upper side of the gaseous fuel injection valve, a lower cover portion that extends from a lower edge margin of the holder portion toward the base portion of said gaseous fuel injection valve, an upper extended portion letting the gaseous fuel delivery pipe support said upper cover portion and toward said gaseous fuel delivery pipe, and a lower extended portion letting the gaseous fuel delivery pipe support said lower cover portion,
said upper cover portions are connected to each other by a plate-like suspension portion, and
the suspension portion is integral with the upper extended portion and formed with cutouts to allow insertion of at least some of the sloped portions.

4. The bi-fuel engine according to claim 1, wherein
said gaseous fuel delivery pipe is fixed to said surge tank.

* * * * *